United States Patent
Roeder et al.

[15] 3,696,526
[45] Oct. 10, 1972

[54] EDUCATIONAL TESTING AND INSTRUCTIONAL DEVICE

[72] Inventors: Harold H. Roeder; Marcia A. Roeder, both of R.D. W. Lake Road, Dunkird, N.Y. 14048

[22] Filed: Feb. 11, 1971

[21] Appl. No.: 114,516

[52] U.S. Cl. ...................... 35/9 E, 35/31 C, 35/35 B
[51] Int. Cl. ................................................. G09b 3/00
[58] Field of Search ........ 35/9 E, 9 F, 76, 35 B, 31 A, 35/31 C; 40/82

[56] References Cited

UNITED STATES PATENTS

| | | |
|---|---|---|
| 2,924,889 | 2/1960 | Di Lauro ...................... 35/9 E |
| 3,020,653 | 2/1962 | Joslow ......................... 35/35 B |
| 3,218,745 | 11/1965 | Golden .......................... 40/82 |

*Primary Examiner*—Wm. H. Grieb
*Attorney*—Bean & Bean

[57] ABSTRACT

A device for use in the instructor-testing and self-instruction of students consisting of a pre-programmed tape carried within a permanently sealed cassette and means manipulatable by the instructor and/or student for a step-wise driving of the tape relative to a pair of alternatively closeable view openings through which a tape carried indicia is to be viewed.

9 Claims, 13 Drawing Figures

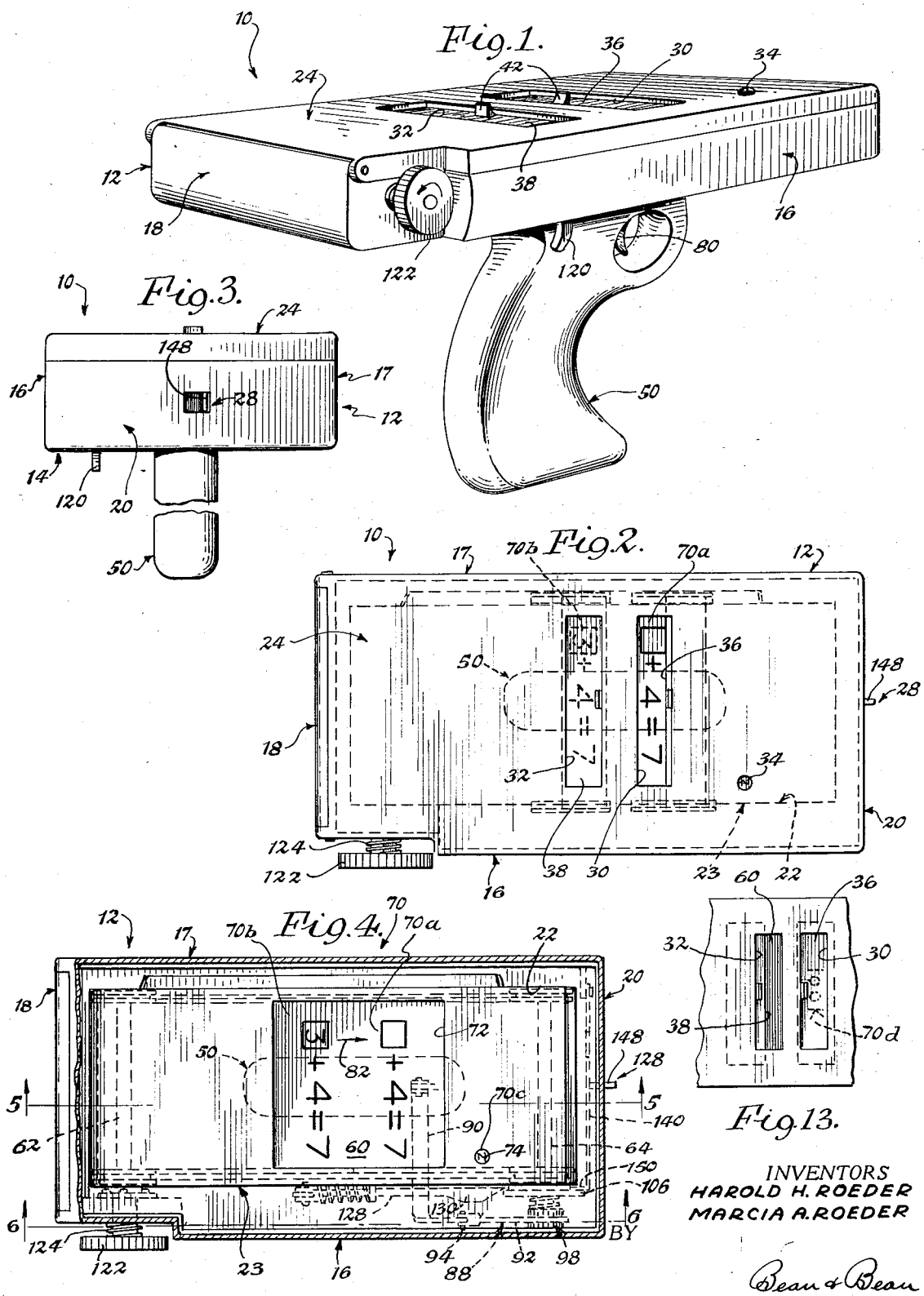

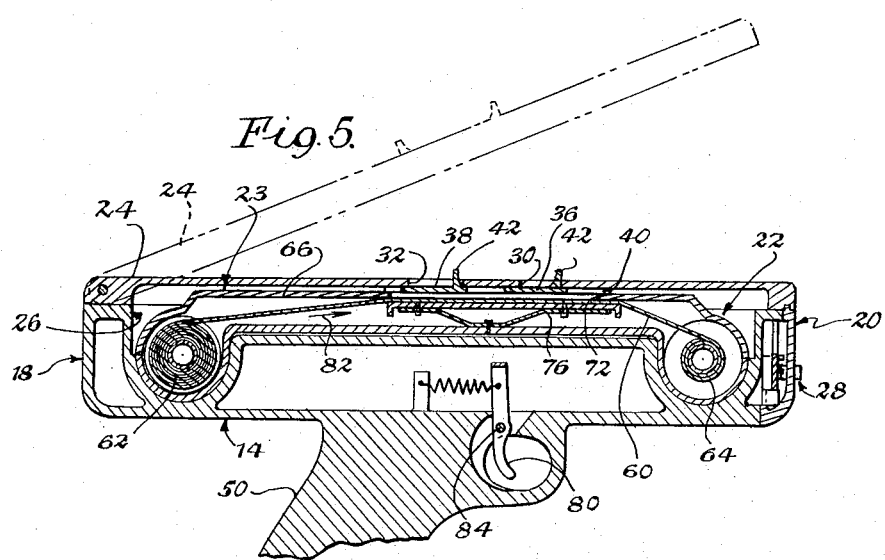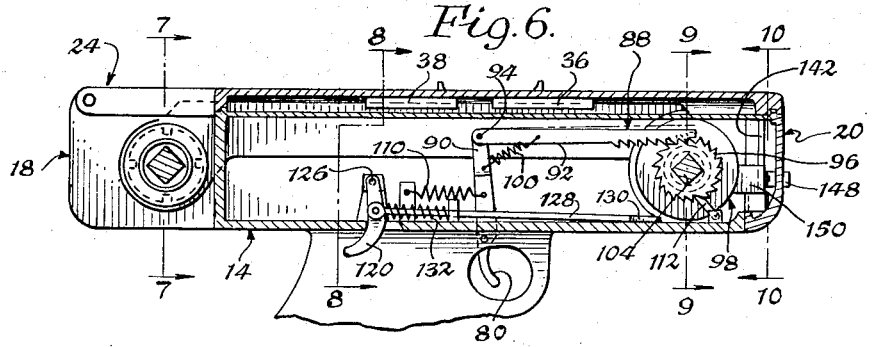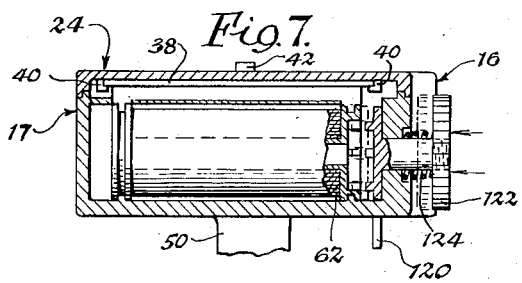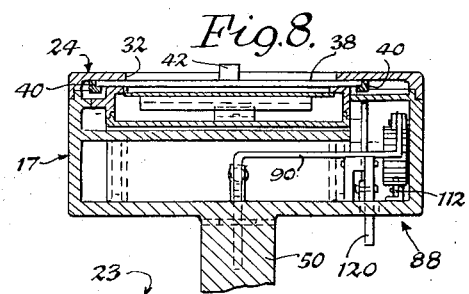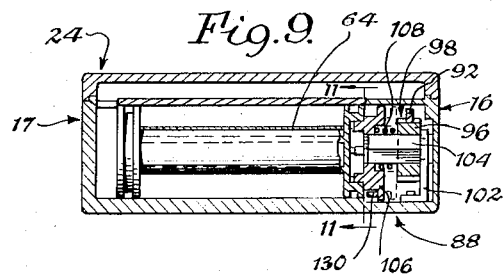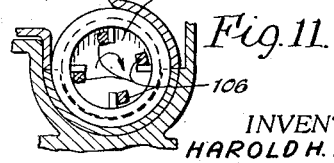

PATENTED OCT 10 1972

INVENTORS
HAROLD H. ROEDER
MARCIA A. ROEDER

BY

*Bean + Bean*
ATTORNEYS

EDUCATIONAL TESTING AND INSTRUCTIONAL DEVICE

SUMMARY OF THE INVENTION

The present invention is directed towards an educational testing and instruction device and more particularly to a device having utility in the diagnosis and treatment of children who experience difficulty in learning to read, and in the individual instruction of students in any area of study which requires the learning of specific facts.

The device of the present invention generally includes a housing defining a cavity having an access opening, which is closeable by a housing top wall portion or cover formed with "question" and "answer" view openings independently closeable by view blocking slides or shutters; a "pistol grip" fixed to the housing for gripping by the hand of a user for conveniently positioning the view openings for view by such user; a programmed tape carried by a cassette removably positioned within the housing cavity; an operating "trigger" positionally associated with the "pistol grip"; and an arrangement for removably connecting the "trigger" with the tape whereby upon operation of the "trigger" the tape is driven in a first direction and in a stepwise manner to position indicia carried thereon successively for viewing through the view openings.

The programmed tape to be used in the practice of the present invention determines the positioning of the slides or shutters relative to the view openings. For instance, in self-instructional areas, such as mathematics, the student would open the "question" shutter and close the "answer" shutter. Thereafter, each time the student presses the trigger, a new set of indicia would be positioned in alignment with the view opening; the mathematical problem to be answered being arranged in alignment with the "question" view opening whereas the answer to such question is aligned with the answer view opening and hidden from view by the "answer" slide. After responding to the question, the student may check his response by moving the answer shutter to unblock the answer view opening. When the student is ready, he merely closes the latter shutter, presses the trigger and continues onto the next question to be answered. When the student reaches the last of the series of questions, he merely rewinds the programmed tape and the cassette is ready to be used again, by the same or another student.

When the device of the present invention is to be used in diagnostic or testing areas, the "question" shutter would be closed and the "answer" shutter opened. Thereafter, each successive operation of the "trigger" would move a stimulus word to be identified for view past the "answer" opening to a position hidden by the "question" opening shutter. The object of this diagnostic test is to ascertain whether the student recognizes the stimulus word from its general configuration during the brief period of exposure or whether the needs to apply various word analyses skills in order to identify such word. If the student correctly identifies the stimulus word when it is exposed in passing beneath the "answer" opening, the diagnostician or the student being tested operates the "trigger" to expose the next stimulus word. When the student experiences difficulty in identifying the word, the examiner again displays the word by opening the question slide and allows the student sufficient time to analyze it. As the student responds to each stimulus word, the diagnostician records the studen's responses on a separate sheet of paper; the record being facilitated by reference numbers, which are associated with each of the series of stimulus words or indicia to be investigated and viewable through a separated cover view opening. The construction and mode of operation of the present device makes it possible for the diagnostician to administer the test with only one hand, thereby freeing his other hand to record the studen's response with little or no difficulty. Further, since the diagnostic material is permanently encased within the cassette, each stimulus word is kept in its proper sequence and the test may be repeated as desired by merely rewinding the tape within the cassette.

DRAWINGS

The nature and mode of the present invention will now be more fully described in the following detailed description taken with the accompanying drawings wherein:

FIG. 1 is a perspective view of the educational-testing device of the present invention;

FIG. 2 is a top plan view of the device illustrated in FIG. 1;

FIG. 3 is an end elevational view of the device illustrated in FIG. 1;

FIG. 4 is a view similar to FIG. 2 but with the cover removed;

FIG. 5 is a sectional view taken generally along line 5—5 in FIG. 4;

FIG. 6 is a sectional view taken generally along line 6—6 in FIG. 4;

FIG. 7 is a sectional view taken generally along line 7—7 in FIG. 6;

FIG. 8 is a sectional view taken generally along line 8—8 in FIG. 6;

FIG. 9 is a sectional view taken generally along line 9—9 in FIG. 6;

FIG. 11 is a sectional view taken generally along line 11—11 in FIG. 9;

FIG. 13 is a fragmentary top plan view illustrating a form of the invention employed for testing students.

DETAILED DESCRIPTION

Figure 10:
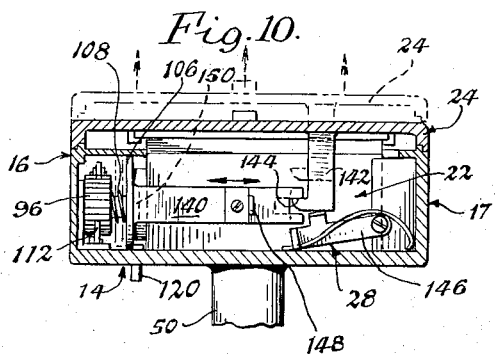
FIG. 10 is a sectional view taken generally along line 10—10 in FIG. 6.

Reference is now made more particularly to FIGS. 1-3 and 12, wherein the educational testing and instructional device of the present invention is designated as 10. Device 10 includes a generally rectangular housing 12 having a bottom wall portion 14, side wall portions 16 and 17, a rear wall portion 18 and a front wall portion 20, which cooperate to define a cavity 22, dimensioned to removably accommodate a sealed tape cassette 23; and a top wall portion or cover 24, which is hingedly secured adjacent rear wall portion 18 for the purpose of selectively closing a cavity opening 26, thereby to retain cassette 23 in inserted position.

Top wall portion 24, which is releasably latched in its closed position by means of a latching device 28 to be hereinafter described, is shown as being formed with generally rectangular "question" and "answer" view openings 30 and 32, respectively, and a generally circular "reference" view opening 34. View openings 30 and 32 may be selectively closed or covered, as desired, by slide plates or shutters 36 and 38, respectively, which may be slideably supported beneath top wall portion 24 by a pair of facing generally L-shaped guides 40 and provided with suitable finger operating tabs 42.

Casing 12 may be manually manipulated for the purpose of presenting question and answer openings 30 and 32 in position for convenient view by a student or child undergoing a test by means of a "pistol grip" 50, which is conveniently formed as an integral part of bottom wall portion 14.

Figure 12:
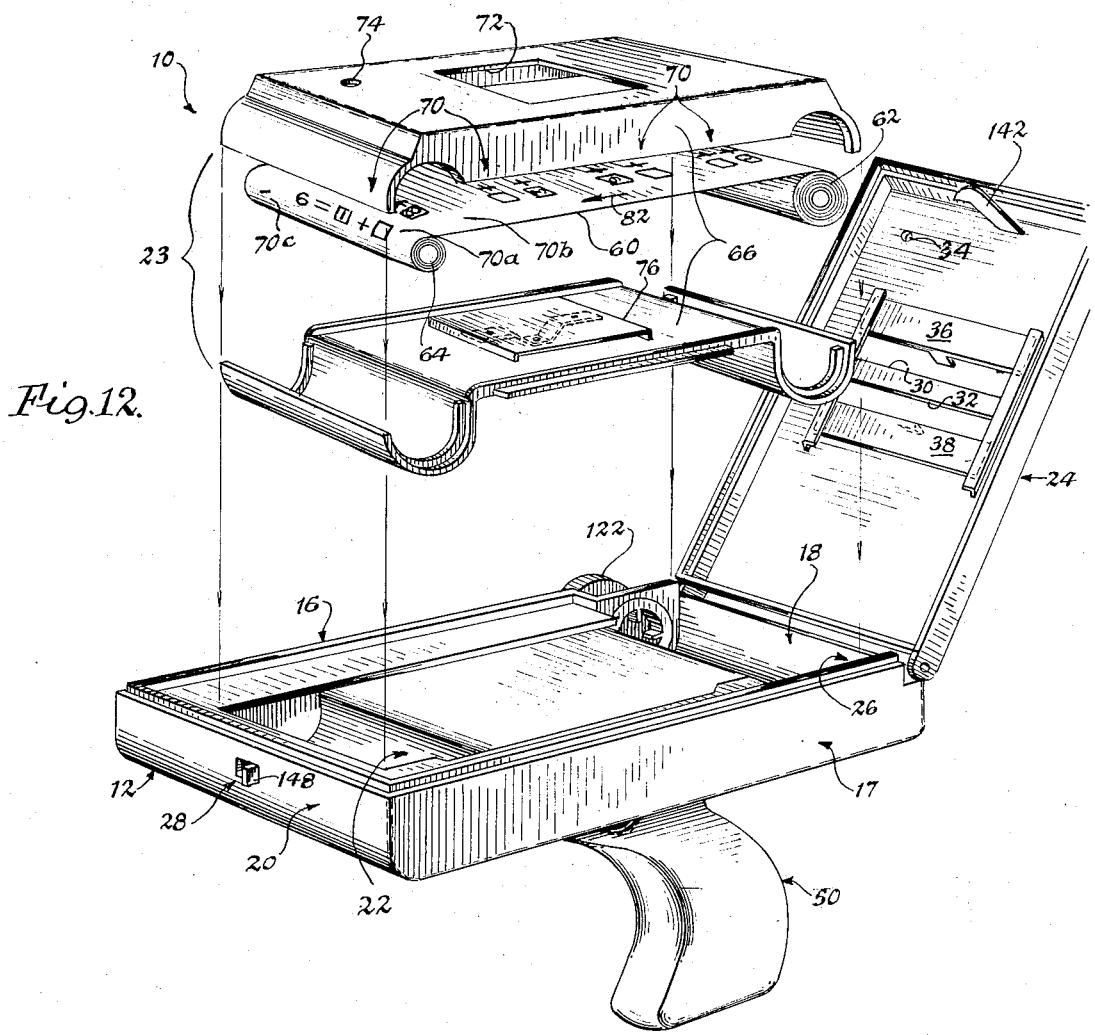
FIG. 12 is an exploded perspective view of the tape cassette housing and indicating the manner of positioning same within the device.

As best shown in FIG. 12, cassette 23 is in the form of a two pair casing, which serves to carry a tape transferable between supply and take up roll devices 62 and 64, respectively, through a connecting tape guide channel 66. In the arrangement shown, tape 60 carries a series of relatively spaced indicia 70, wherein separate indicia of the series include a pair of indicia comprising mathematical "question" and "answer" indicia 70a and 70b, respectively. However, it will be understood that "question" and "answer" indicia other than mathematical equations may be employed as desired.

Preferably, reference indicia, such as numeral 70c, is associated with each separate pair of indicia of the series in order to permit an instructor or student to quickly determine which indicia of the series is being viewed at any given time. Indicia 70a and 70b, and 70c of each separate indicia are successively viewable through guide channel apertures 72 and 74, respectively; the latter being positionally aligned with view openings 30 and 32, and reference view opening 34, respectively, when cassette 23 is in cavity 22 and cover 24 is in closed position. In the preferred form of cassette 23, a spring biased plate 76 is positioned within guide channel 66 in order to guidingly position tape 60 adjacent aperture 72.

Associated with "pistol grip" 50 is a "trigger" 80, which is manually operable by instructor or student for the purpose of advancing tape 60 in a step-wise manner in the direction indicated by arrow 82 in FIGS. 4, 5 and 12 in order to successively position "question" and "answer" indicia in alignment with the "question" and "answer" view openings. "Trigger" 80, which is supported by pin shaft 84, for pivotal movement relative to "pistol grip" 50, is operably connected to tape takeup roll device 64 by a drive coupling arrangement 88, which is best shown in FIGS. 4, 6 and 8. In the construction shown, coupling 88 includes a generally L-shaped transversely disposed trigger extension 90, which is preferably formed integrally with "trigger" 80; and a ratchet pawl 92, which is pivotally joined to extension 90 as by pin shaft 94 and normally biased into engagement with a ratchet wheel 96 of a takeup roll device engaging assembly 98 by a tension spring 100. Assembly 98 is best shown in FIG. 9 as including a mounting post 102, which serves to journal a non-circular cross-sectioned stub shaft 104; the stub shaft fixedly mounting ratchet wheel 96 and slideably mounting a member 106, which is adapted to be normally biased into interlocking driving engagement with takeup roll device 64 by a compression spring 108.

As will be apparent from viewing FIGS. 5 and 6, the squeezing of "trigger" 80 serves to drive takeup roll device 64 in a clockwise direction thereby to advance tape 60 sufficiently to present the next succeeding pair of "question" and "answer " indicia in alignment with "question" and "answer" view openings 30 and 32, respectively. When squeezing pressure on "trigger" is released, spring 110 serves to return the extension 90 and ratchet pawl 92 to their original positions, whereas a spring biased locking pawl 112 serves to prevent counter rotation of assembly 98. Any suitable means may be provided to limit or vary the distance through which tape 60 is driven for each operation of "trigger" 80. However, with the arrangement shown, it is necessary to provide for progressively increasing spacings between separate indicia carried by tape 60, so as to accommodate for variations in the distance through which the tape is driven as the diameter of tape carried by takeup roll device 64 increases.

Tape 60 may be rewound on supply roll device 62 when desired by operating release lever 120, while simultaneously depressing rewind wheel 122 for engagement with supply roll device 62 and effecting rotations of wheel 122 in a counter-clockwise direction, as viewed in FIG. 1. As will be apparent from viewing FIG. 7, wheel 122 is normally maintained out of driving engagement with supply roll device 62 by compression spring 124. Referring to FIGS. 4, 6 and 9, it will be understood that release lever 120 is pivotally supported in the housing by a suitable pin shaft 126 and is pivotally connected to a reciprocating actuator rod 128 having a head end portion 130 engageable with member 106. Thus, when release lever 120 is pivoted in a counter-clockwise direction, as viewed in FIG. 6, head end portion 130 is brought into camming engagement with member 106, such as to force the latter to slide along rod 104 against the bias of return spring 108 out of driving engagement with takeup roll device 64. Compression spring 132 normally serves to maintain release lever 120 and associated parts in the inoperative position shown in FIG. 6.

Latching device 28 is best shown in FIGS. 4, 6 and 10 as including a generally L-shaped release bar 140, which is suitably supported inwardly of front wall portion 20 for reciprocating movement transversely of housing 12; a catch 142, which is secured to cover 24 and adapted to be releasably locked within bar recess 144; and a spring biased pivotally supported lug plate 146, which is engageable by catch 142 when cover 24 is moved into its closed position. As will be apparent from viewing FIGS. 4 and 10, bar 140 carries an operating tab 148, which freely extends through front wall portion 20 and a bent end portion 150 normally arranged in engagement with member 106. When cover 24 is moved into its closed position, catch 142 first engages bar 140 thereby serving to move the latter to the left, as viewed in FIG. 10, against the return bias of spring 108, and subsequently engages lug plate 146 thereby to move the latter into its full line position, also shown in FIG. 10. When cover 24 is fully closed, catch 142 moves into alignment with recess 144, thereby permitting spring 108 to move member 106 into driving engagement with takeup roll device 64 and reciprocate bar 140 to the right, as viewed in FIG. 10 in order to retain catch 142 within recess 144. Rattling of the catch within the recess is effectively prevented by lug plate 146. Opening of cover 24 is effected by moving tab 148 to the left, as viewed in FIG. 10, so as to remove catch 142 from engagement within recess 144 and thereby permit lug plate 146 to resiliently urge cover 24 upwardly from its closed position. At the same time, end portion 150 forces member 106 out of engagement with takeup roll device 64, thereby permitting immediate withdrawal of cassette 23 from the housing.

When employing a tape programmed with a series of "question" and "answer" indicia, shutters 36 and 38 are moved into their relative positions shown in FIG. 2. Thus, each time "trigger" 80 is squeezed, a "question" indicia 70a is presented for view through opening 30, while its associated "answer" indicia 70 is hidden from view by shutter 38. After the student has decided the answer to the question presented, he checks such answer by moving shutter 38 to unblock opening 32. Before proceeding to the next "question" of the series, the student returns shutter 38 to its original position.

When device 10 is to be used in diagnostic or testing arrangements, "question" shutter 36 would normally be closed and "answer" shutter 38 opened, as shown in FIG. 13; and tape 60 provided with a series of spaced "stimulus word" indicia 70d. In this arrangement, each successive operation of "trigger" 80 would move a "stimulus word" 70d to be identified for view past "answer" view opening 32 to a position hidden by "question" shutter 36. If a student correctly identifies the "stimulus word", when it is exposed in passing beneath "answer" view opening 32, the diagnostician or the student being tested operates "trigger" 80 to expose the next succeeding "stimulus word." However, when the student experiences difficulty in identifying the "stimulus word," the diagnostician would again display such word by opening "question" shutter 36 and allow the student sufficient time to analyze it. A record of student response is facilitated by reference indicia, which is associated with each "stimulus word" and viewable through reference view opening 34 in the manner previously described.

We claim:

1. An educational testing and instruction device comprising in combination:

a housing defining a cavity having an access opening, said housing having spaced top and bottom wall portions, said top wall portion normally closing said cavity access opening and being movable to afford access to said cavity, said top wall portion being formed with "question" and "answer" view openings therethrough and carrying means to selectively close said openings;

a "pistol grip" fixed to said bottom wall portion for gripping by the hand of a user for manipulating said housing and for conveniently positioning said view openings for view by the user;

a tape carrying on at least one side thereof a series of indicia to be viewed by the user through said view openings;

means for mounting said tape within said cavity for removal through said access opening;

an operating "trigger" positionally associated with said "pistol grip"; and drive means for connecting said "trigger" to said tape for driving said tape in a first direction and in a step-wise manner to position indicia of said series successively for viewing through said view openings.

2. A device according to claim 1, wherein said view openings are spaced apart in said direction of tape movement, and said view opening closing means includes slide plates movable in relatively opposite directions for closing said openings.

3. A device according to claim 2, wherein said housing and said top wall portion are of generally rectangular plan view configuration and said top wall portion is hingedly secured to said housing for pivotal movement between access opening closed and open positions, and there is further provided means to releasably retain said top wall portion in access opening closed position, the last said means when operated to release said top wall portion being operative to disconnect said drive means from said tape.

4. A device according to claim 1, wherein separate indicia of said series includes a pair of indicia comprising "question" and "answer" indicia, respectively, indicia of each said pair being spaced apart co-directionally with said first direction a distance substantially equal to the spacing between said view openings, and the spacing between adjacent pairs of indicia substantially corresponding to distance through which said tape is driven by a single operation of said "trigger."

5. A device according to claim 1, wherein said view openings are spaced apart in said direction of tape movement, and the spacing between adjacent indicia of said series corresponds substantially to the distance through which said tape is driven by a single operation of said "trigger," said tape being orientated relative to said view openings such that each time said "trigger" is operated, successive separate indicia of said series are moved across said "answer" view opening and positioned in alignment with said "question" opening, said means for selectively closing said openings removably closing only said "question" opening.

6. An educational testing and instruction device according to claim 1, wherein said tape mounting means includes a holder removably received within said cavity through said cavity opening, said holder including tape supply roll means, tape takeup roll means and a tape guide channel extending between and joining said roll means, said guide channel having aperture means to permit viewing of tape therewithin through said view openings when said holder is received within said cavity; and said drive means is removably connected to said takeup roll means for driving said tape between said roll means.

7. An educational testing and instruction device according to claim 6, wherein said tape carries further indicia for indicating the sequence in which said series of indicia is viewed, said top wall portion is provided with a further view opening, and said further indicia is viewable through said aperture means and said further view opening when its associated indicia of said series is viewable through said view openings as aforesaid.

8. An educational testing and instruction device according to claim 6, wherein said device additionally includes means for rendering said drive means inoperative and for rewinding said tape in a direction counter to said first direction between said roll means.

9. An educational testing and instruction device comprising in combination:

a housing defining a cavity and having spaced top and bottom wall portions bounding said cavity, said top wall portion being formed with "question" and "answer" view openings therethrough and carrying a pair of slide plates manually movable to selectively close said openings;

a "pistol grip" fixed to said bottom wall portion for gripping by the hand of a user for manipulating said housing and for conveniently positioning said view openings for view by the user;

a tape carrying on at least one side thereof a series of indicia to be viewed by the user through said view openings;

means for mounting said tape within said cavity;

an operating "trigger" positionally associated with said "pistol grip"; and drive means for connecting said "trigger" to said tape for driving said tape in a first direction and in a step-wise manner to position indicia of said series successively for viewing through said view openings.

* * * * *